(12) United States Patent
Fuse et al.

(10) Patent No.: US 10,438,342 B2
(45) Date of Patent: Oct. 8, 2019

(54) ABNORMALITY DETECTION DEVICE, ABNORMALITY DETECTION METHOD AND NON-TRANSITORY COMPUTER-READABLE RECORDING MEDIUM

(71) Applicant: FUJITSU LIMITED, Kawasaki-shi, Kanagawa (JP)

(72) Inventors: Takashi Fuse, Hadano (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 257 days.

(21) Appl. No.: 15/594,930

(22) Filed: May 15, 2017

(65) Prior Publication Data

US 2017/0249728 A1 Aug. 31, 2017

Related U.S. Application Data

(63) Continuation of application No. PCT/JP2014/080695, filed on Nov. 19, 2014.

(51) Int. Cl.
*G06T 7/00* (2017.01)
*G06T 7/246* (2017.01)

(52) U.S. Cl.
CPC .............. *G06T 7/001* (2013.01); *G06T 7/248* (2017.01); *G06T 2207/10016* (2013.01);
(Continued)

(58) Field of Classification Search
CPC ................... G06T 7/001; G06T 7/248; G06T 2207/30164; G06T 2207/20081; G06T 2207/30244; G06T 2207/10016
See application file for complete search history.

(56) References Cited

U.S. PATENT DOCUMENTS

2007/0291991 A1 12/2007 Otsu et al.
2008/0123975 A1 5/2008 Otsu et al.
(Continued)

FOREIGN PATENT DOCUMENTS

EP 1801757 6/2007
JP 2002067115 A * 3/2002
(Continued)

OTHER PUBLICATIONS

Translated Version of JP2002-067115 (Year: 2002).*
(Continued)

*Primary Examiner* — Carol Wang
(74) *Attorney, Agent, or Firm* — Staas & Halsey LLP

(57) ABSTRACT

In a preparation stage, an abnormality detection device detects a first characteristic amount from each first frame contained in video data and stores the first characteristic amount in a storage unit. In an abnormality detection stage, the abnormality detection device detects a second characteristic amount from each second frame contained in video data obtained by imaging a work operation of the robot and stores the first characteristic amount in the storage unit. The abnormality detection device compares the second characteristic mount of the second frame and the first characteristic amount of each of the first frames and specifies the first characteristic amount that is the closest to the second characteristic amount. The abnormality detection device determines whether the work operation of the robot in the abnormality detection stage is abnormal on the basis of the specified first characteristic amount and the second characteristic amount.

4 Claims, 14 Drawing Sheets

(52) U.S. Cl.
CPC .............. *G06T 2207/20081* (2013.01); *G06T 2207/30164* (2013.01); *G06T 2207/30244* (2013.01)

(56) References Cited

U.S. PATENT DOCUMENTS

| | | | |
|---|---|---|---|
| 2012/0004887 A1 | 1/2012 | Kawaguchi et al. | |
| 2012/0151344 A1* | 6/2012 | Humphrey | G09B 5/065 715/716 |
| 2015/0038806 A1* | 2/2015 | Kaleal, III | A61B 5/4872 600/301 |
| 2016/0034750 A1* | 2/2016 | Bishop | G06K 9/00288 382/118 |

FOREIGN PATENT DOCUMENTS

| | | | | |
|---|---|---|---|---|
| JP | 2006-79272 | | 3/2006 | |
| JP | 2006-178790 | | 7/2006 | |
| JP | 2007-80136 | | 3/2007 | |
| JP | 2007-334756 | | 12/2007 | |
| JP | 2012-178036 | | 9/2012 | |
| JP | 2013191032 | A * | 9/2013 | |
| KR | 20160025224 | A * | 3/2016 | |

OTHER PUBLICATIONS

Translated Version of JP2012-178036 (Year: 2012).*
Translated Version of JP2013-191032 (Year: 2013).*
Translated Version of KR20160025224 (Year: 2016).*
International Search Report dated Feb. 3, 2015 in corresponding International Application No. PCT/JP2014/080695.
Written Opinion of the International Searching Authority dated Feb. 3, 2015 in corresponding International Application No. PCT/JP2014/080695.
Extended European Search Report, dated Oct. 13, 2017, in European Application No. 14906315.8 (8 pp.).
Iwata, K. et al., *Application of the Unusual Motion Detection Using CHLAC to the Video Surveillance*, ICONIP 2007, Part II, LNCS 4985, pp. 628-636.
Shiraki, T. et al., *Real-Time Motion Recognition Using CHLAC Features and Cluster Computing* (7 pp.).

* cited by examiner

| TEACHER POINT | WORK CONTENT |
|---|---|
| T1 | WORK CONTENT 1 |
| T2 | WORK CONTENT 2 |
| T3 | WORK CONTENT 3 |
| T4 | WORK CONTENT 4 |
| T5 | WORK CONTENT 5 |
| T6 | WORK CONTENT 6 |
| ... | ... |

ABNORMALITY DETECTION DEVICE, ABNORMALITY DETECTION METHOD AND NON-TRANSITORY COMPUTER-READABLE RECORDING MEDIUM

CROSS-REFERENCE TO RELATED APPLICATION

This application is a continuation application of International Application PCT/JP2014/080695, filed on Nov. 19, 2014, and designating the U.S., the entire contents of which are incorporated herein by reference.

FIELD

The present invention relates to an abnormality detection device, etc.

BACKGROUND

Factory automation (FA) systems that use industrial robots to achieve unattended operations of operations that were used to be performed by workers and accordingly make improvements in redaction of errors in works made by workers, in working efficiency, and in the safety of workers are used in many work sites.

In an FA system, in an assembling process consisting of repeated works done by a robot, for example, the effect of a slight difference in the positions in which parts to be assembled are set or the handling posture of the robot may feed through to the following assembling work and thus trigger occurrence of non-conforming products.

For this reason, the manager of the FA system takes measures not to cause non-conforming products by regularly inspecting the operation of each robot and the positions in which parts to be assembled are set, etc.

Patent Document 1: Japanese Laid-open Patent Publication No. 2007-334756
Patent Document 2: Japanese Laid-open Patent Publication No. 2006-79272
Patent Document 3: Japanese Laid-open Patent Publication No. 2006-178790

The above-described conventional technology however has a problem in that it is not possible to accurately detect abnormality due to a variance in the work of a robot that causes non-conforming products.

For example, in the conventional FA system, the manager takes measures by regularly inspecting the operations of each robot and the positions in which members to be assembled are set; however, it is difficult to manually find a slight variance in the work. Abnormality due to a variance in the work has an effect on the product being assembled and therefore it is preferable that a variance in the work be detected on site; however, it difficult to detect such a variance as described above and thus only what can be done conventionally is to estimate whether there was a variance in the work from the result of examining whether a product is a conforming product or a non-conforming product after the product is assembled. The problem is not limited to robots and occurs similarly in the case where abnormality of a subject that does a given work is detected.

SUMMARY

According to an aspect of the embodiment of the invention, an abnormality detection device including: a memory; and a processor coupled to the memory, wherein the processor executes a process including: storing each first frame contained in video data obtained by imaging a normal work operation of a subject and a first characteristic amount representing a characteristic of the first frame in association with each other in the memory; storing each second frame contained in video data obtained imaging a work operation of the subject and a second characteristic amount representing a characteristic of the second frame in association with each other in the memory; comparing the second characteristic amount of the second frame with the first characteristic amount of each first frame; specifying the first characteristic amount that is the closest to the second characteristic amount; and determining whether the work operation is abnormal on the basis of the specified first characteristic amount and the second characteristic amount.

The object and advantages of the invention will be realized and attained by means of the elements and combinations particularly pointed out in the claims.

It is to be understood that both the foregoing general description and the following detailed description are exemplary and explanatory and are not restrictive of the invention.

According to the first embodiment of the present invention, it is possible to accurately detect abnormality due to a variance in the work of the subject.

[EMBODIMENTS FOR CARRYING OUT THE INVENTION] (DESCRIPTION OF EMBODIMENTS)

Embodiments of the abnormality detection device, the abnormality detection method, and the abnormality detection program according to the present invention will be described in detail below on the basis of the drawings.

First Embodiment

Figure 1:
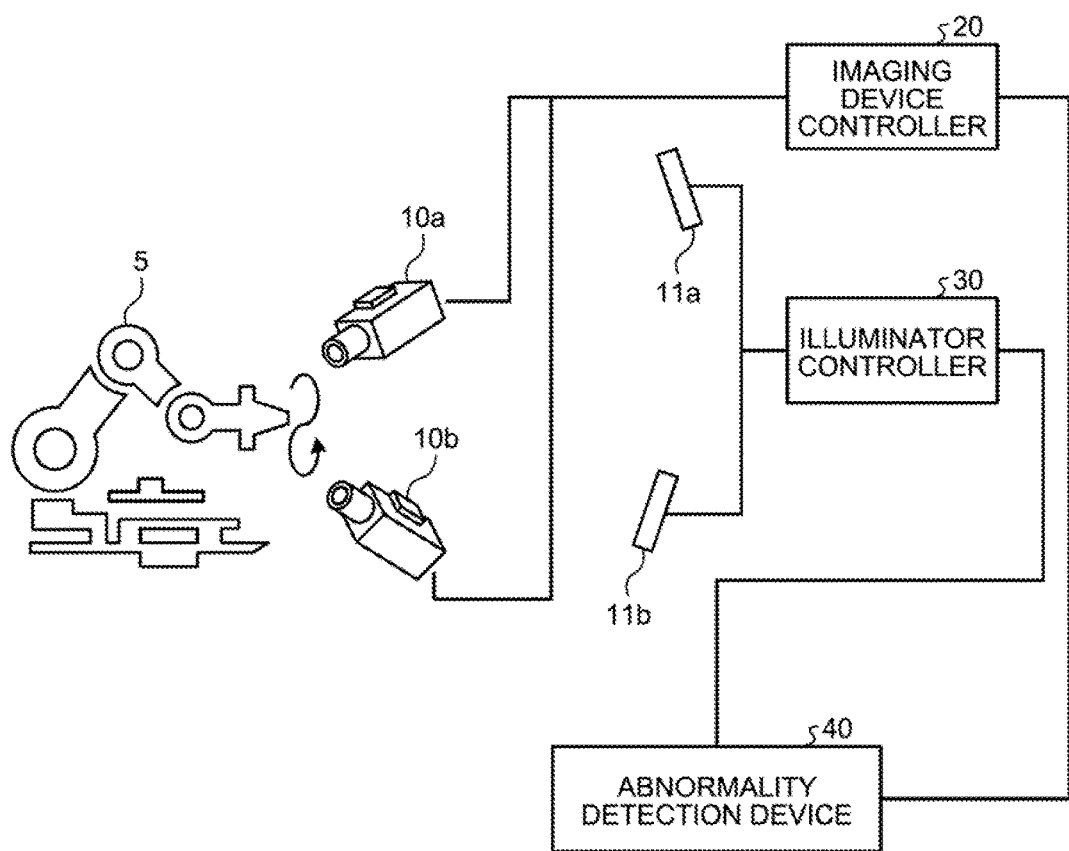
FIG. 1 is a diagram representing a system of a reference example.

Before the embodiments are described, a reference example that is the assumption of the embodiments will be described. The reference example does not correspond to the conventional technology. FIG. 1 is a diagram representing a system of the reference example. As illustrated in FIG. 1, the system of the reference example includes a robot 5, imaging devices 10a and 10b, illuminators 11a and 11b, an imaging device controller 20, an illuminator controller 30, and an abnormality detection device 40.

The robot 5 is a robot that does a given assembling work according to teacher data. The teacher data is data in which the time after the start of the operation and the content of the work of the robot 5 are associated with each other.

The imaging devices 10a and 10b are devices that images the robot 5 serving as a subject in accordance with a control signal from the imaging device controller 20. The imaging devices 10a and 10b will be collectively referred to as an imaging device 10. The imaging device 10 outputs video data on the robot 5 to the imaging device controller 20.

The illuminators 11a and 11b are illuminators that illuminate the robot 5 in accordance with a control signal from the illuminator controller 30. The illuminators 11a and 11b will be collectively referred to as an illuminator 11.

The imaging device controller 20 is a device that outputs a control signal to the imaging device 10 to cause the imaging device 10 to operate and acquires the video data on the robot 5 from the imaging device 10. The imaging device controller 20 outputs the video data to the abnormality detection device 40.

The illuminator controller 30 is a processing unit that outputs a control signal to the illuminator 11 to turn on the illuminator 11.

The abnormality detection device 40 is a device that detects whether there is abnormality in the operation of the robot 5. In a preparation stage, the abnormality detection device 40 stores a frame contained in video data obtained by imaging a normal work operation of the robot 5 and the amount of a characteristic of the frame in association with each other in a storage unit. Furthermore, in an abnormality detection stage, the abnormality detection device 40 stores a frame contained in video data obtained by imaging a work operation of the robot 5 and the amount of a characteristic of the frame in association with each other in the storage unit.

In the following descriptions, the frames contained in the video data obtained by imaging the normal work operation of the robot 5 in the preparation stage will be referred to as first frames. The amount of a characteristic of the first frame will be referred to as a first characteristic amount. The frames contained in the video data obtained by imaging the work operation of the robot 5 in the abnormality detection stage will be referred to as second frames. The amount of the characteristics of the second frame will be referred to as a second characteristic amount.

The abnormality detection device 40 compares the first characteristic amounts of the first frames and the second characteristic amounts of the second frames sequentially from the top. For example, the abnormality detection device 40 compares the first characteristic amount of the first frame at a time tn and the second characteristic amount of the second frame at the time tn sequentially, where n is a natural number. When there is a set of a first frame and a second frame with respect to which an abnormality value representing the distance between the characteristic amounts is equal to or larger than a threshold, the abnormality detection device 40 determines that there is abnormality in the work operation of the robot 5.

Figure 2:
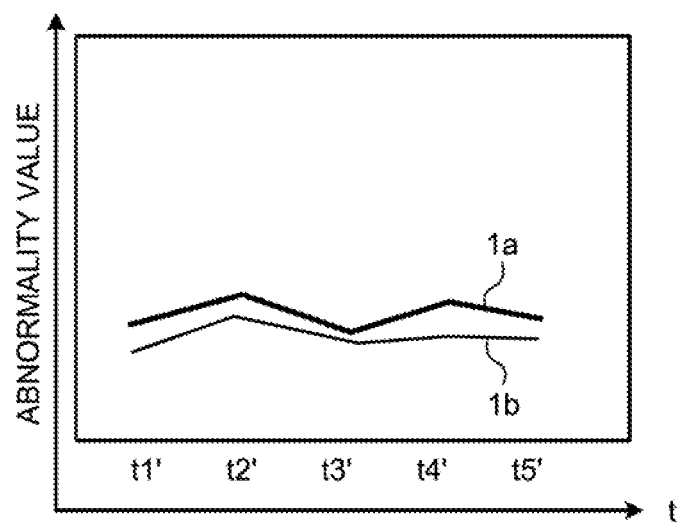
FIG. 2 is a graph (1) representing an exemplary transition of the abnormality value of the reference example.
Figure 3:
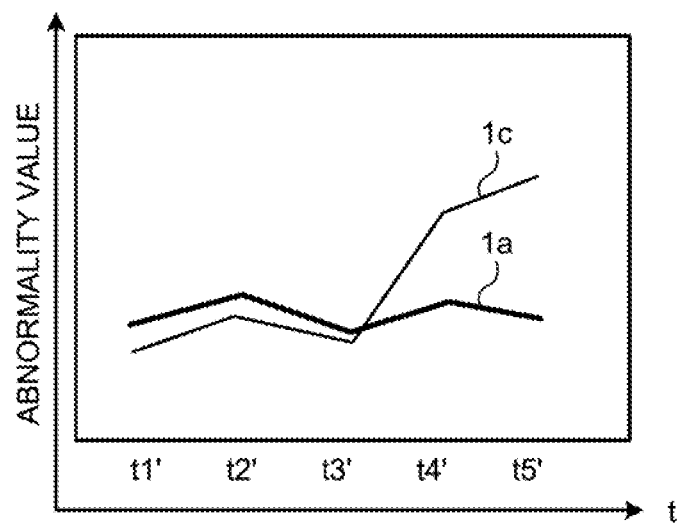
FIG. 3 is a graph (2) representing an exemplary transition of the abnormality value of the reference example.

FIGS. 2 and 3 are graphs representing exemplary transitions of the abnormality value of the reference example. In FIGS. 2 and 3, the vertical axis is an axis representing the abnormality value and the horizontal axis is an axis representing the time. FIG. 2 represents the transition of the abnormality value in which abnormality is not detected in the abnormality detection stage in the reference example. FIG. 3 represents the transition of the abnormality value in which abnormality is detected in the abnormality detection stage in the reference example.

FIG. 2 will be described. A line segment 1a represented in FIG. 2 is a line representing an average value in a normal space. The average value in the normal space is, for example, the value obtained in a way that, in the preparation stage, the normal work operation of the robot 5 is imaged repeatedly and multiple sets of video data are used, and the distances between the multiple first characteristic amounts are averaged. A line segment 1b is a line segment representing the distance between the first characteristic amount and the second characteristic amount. In the following descriptions, the distance between the first characteristic amount and the second characteristic amount will be referred to as the abnormality value as appropriate. The abnormality value of the line segment 1b is not equal to or larger than the threshold and thus the abnormality detection device 40 determines that there is no abnormality in the work of the robot 5 in the abnormality detection stage.

FIG. 3 will be described, the line segment 1a represented in FIG. 3 corresponds to the line segment 1a represented in FIG. 2. A line segment 1c is the abnormality value representing the distance between the first characteristic amount and the second characteristic amount. The abnormality value of the lien segment 1c is equal to or larger than the threshold and thus the abnormality detection device 40 determines that there is abnormality in the work of the robot 5 in the abnormality detection stage.

Figure 4:
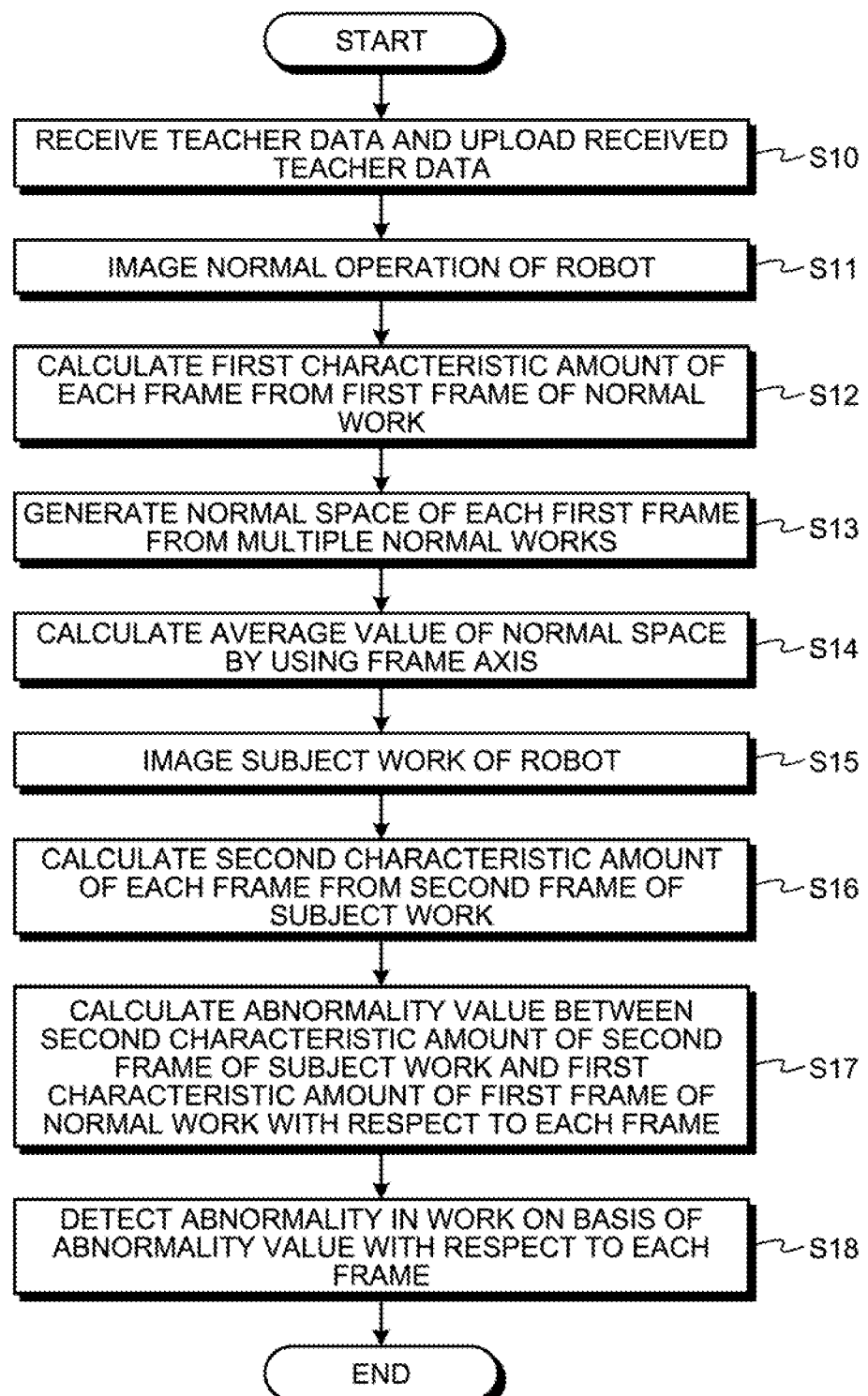
FIG. 4 is a flowchart illustrating a procedure of processes performed by the system of the reference example.

An exemplary procedure of processes performed by the system of the reference example will be described. FIG. 4 is a flowchart illustrating the procedure of processes performed by the system of the reference example. As illustrated in FIG. 4, the abnormality detection device 40 receives teacher data and uploads the received teacher data into the robot 5 (step S10). The imaging device 10 images a normal operation of the robot (step S11) and, from the first frames of the normal work, the abnormality detection device 40 calculates a first characteristic amounts of each of the first frames (step S12).

The abnormality detection device 40 generates normal spaces of the first frames from multiple normal works (step S13). The abnormality detection device 40 calculates an average of the normal spaces by using the frame axis (step S14).

In the abnormality detection stage, the imaging device 10 images a subject work of the robot 5 (step S15). From the second frames of the subject work, the abnormality detection device 40 calculates a second characteristic amount of each of the second frames (step S16). The abnormality detection device 40 calculates, with respect to each frame, an abnormality value between the second characteristic amount of the second frame of the subject work and the first characteristic amount of the first frame of the normal work (step S17). The abnormality detection device 40 detects abnormality in the work on the basis of the abnormality value with respect to each frame (step S18).

As described above, the abnormality detection device 40 of the reference example calculates the abnormality value between the first characteristic amount of the normal operation and the second characteristic amount in the abnormality detection stage and, when the abnormality value exceeds the threshold, determines that there is abnormality in the work of the robot 5. Accordingly, in the reference example, even without regular inspection of the robot 5 by the manager, it is possible to automatically detect abnormality in the robot 5.

The above-described reference example however has a problem in that, even when a variance in the work that does not have any adverse effect on the assembling work occurs, it is erroneously detected that abnormality occurs in the work of the robot 5. A variance in the work that does not have any adverse effect on the assembling work, for example, corresponds to a variance in the work time due to the positioning of parts and a slight variance in the work time that is difficult to control and that depends on the moving speed or the moving distance of the robot 5.

Figure 5:
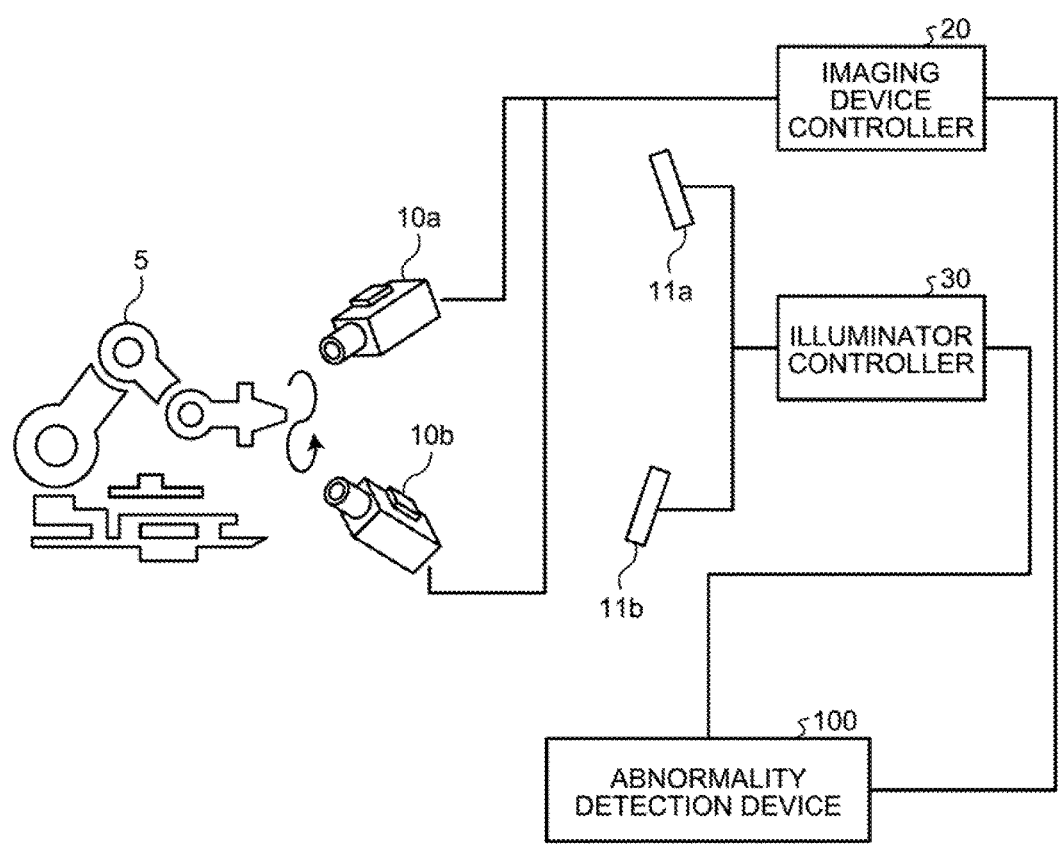
FIG. 5 is a diagram representing a configuration of a system according to a first embodiment.

A configuration of the system according to a first embodiment will be described. FIG. 5 is a diagram representing a configuration of the system according to the first embodiment. As illustrated in FIG. 5, the system includes the robot 5, the imaging devices 10a and 10b, the illuminators 11a and 11b, the imaging device controller 20, the illuminator controller 30, and an abnormality detection device 100.

Descriptions of the robot 5, the imaging devices 10a and 10b, the illuminators 11a and 11b, the imaging device controller 20, and the illuminator controller 30 are the same as those given to FIG. 1 and thus they will be omitted here.

Figure 6:
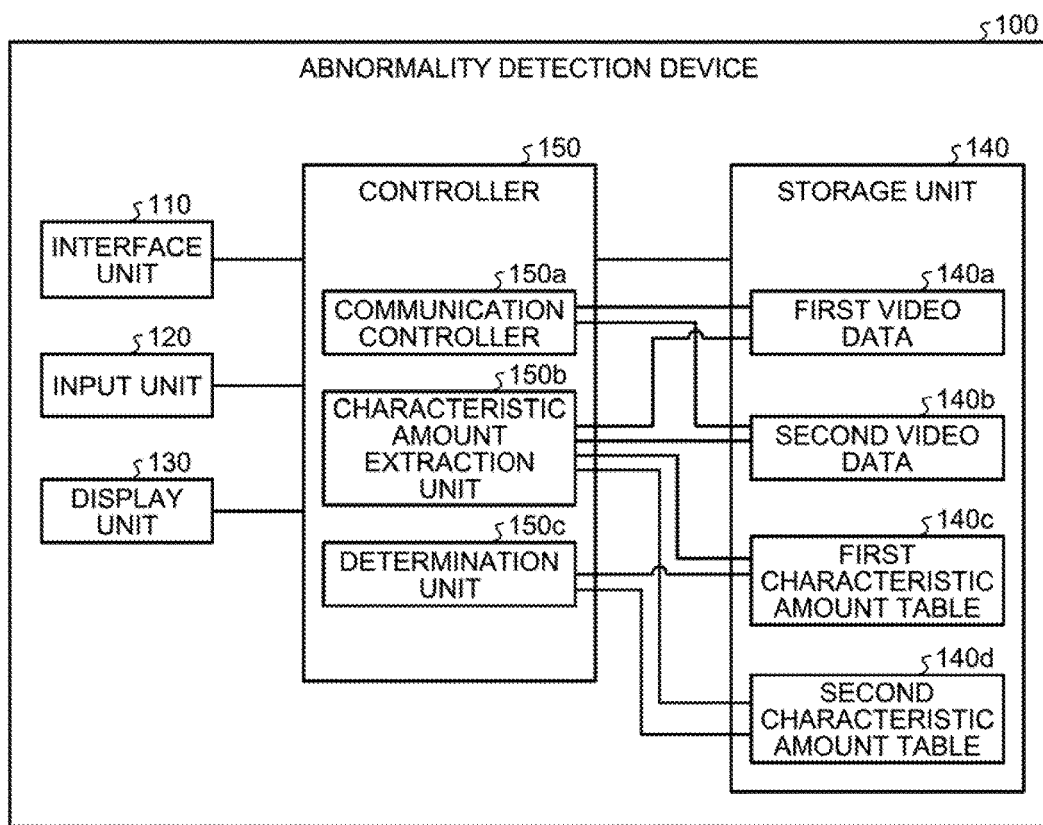
FIG. 6 is a functional block diagram representing a configuration of an abnormality detection device according to the first embodiment.

The abnormality detection device 100 is a device that detects whether there is abnormality in the operation of the robot 5. FIG. 6 is a functional block diagram representing the configuration of the abnormal detection device according to the first embodiment. As represented in FIG. 6, the abnormality detection device 100 includes an interface unit 110, an input unit 120, a display unit 130, a storage unit 140 and a controller 150.

The interface unit 110 is a processing unit that executes data communications with the imaging device controller 20 and the illuminator controller 30. The controller 150, which will be described below, communicates data with the imaging device controller 20 and the illuminator controller 30 via the interface unit 110.

The input unit 120 is an input device that inputs various types of information to the abnormality detection device 100. The input unit 120 corresponds to, for example, a keyboard and a mouse. The display unit 130 is a display device that displays various types of information that is output from the controller 150 and corresponds to, for example, a liquid crystal display or a monitor.

The storage unit 140 includes first video data 140a, second video data 140b, a first characteristic amount table 140c and a second characteristic amount table 140d. The storage unit 140 corresponds to a semiconductor memory device, such as a random access memory (RAM), a read only memory (ROM) or a flash memory, or a storage device, such as a hard disk drive (HDD).

The first video data 140a is data corresponding to video data obtained by imaging the normal work operation of the robot 5 in the preparation stage. In the first video data 140a, the time and the first frame of the video data corresponding to the time are associated with each other.

The second video data 140b is data corresponding to video data obtained by imaging the work operation of the robot 5 in the abnormality detection stage. In the second video data 140b, a time and the second frame of the video data corresponding to the time are associated with each other.

The first characteristic amount table 140c is data including the first characteristic amounts that are extracted from the second frames at the respective times. In the first characteristic amount table 140c, a time and the first characteristic amount that is extracted from the first frame corresponding to the time are associated with each other.

The second characteristic amount table 140d is data including the second characteristic amounts that are extracted from the second frames at the respective times. In the second characteristic amount table 140d, a time and the second characteristic amount that is extracted from the second frame corresponding to the time are associated with each other.

The controller 150 includes a communication controller 150a, a characteristic amount extraction unit 150b, and a determination unit 150c. The controller 150 corresponds to an integrated device, such as an application specific integrated circuit (ASIC) or a field programmable gate array (FPGA). The controller 150 corresponds to an electronic circuit, such as a central processing unit (CPU) or a micro processing unit (MPU).

The communication controller 150a is a processing unit that performs data communications with the imaging device controller 20 and acquires video data. For example, the communication controller 150a acquires the video data obtained by imaging the normal work operation of the robot 5 in the preparation stage from the imaging device controller 20. In the preparation stage, the communication controller 150a stores the video data that is acquired from the imaging device controller 20 in the storage unit 140 as the first video data 140a.

The communication controller 150a acquires the video data obtained by imaging the work operation of the robot 5 in the abnormality detection stage from the imaging device controller 20. In the abnormality detection stage, the communication controller 150a stores the video data that is acquired from the imaging device controller 20 in the storage unit 140 as the second video data 140b.

While the imaging device is performing imaging in the preparation stage and the abnormality detection stage, the communication controller 150a outputs a control instruction to turn on the illuminators to the illuminator controller 30.

The characteristic amount extraction unit 150b extracts the first characteristic amounts from the respective first frames of the first video data 140a and registers, in the first characteristic amount table 140c, the extracted first characteristic amounts in association with the times corresponding to the first frames from which the first characteristic amounts are extracted. The characteristic amount extraction unit 150b extracts the second characteristic amounts from the respective second frames of the second video data 140b and stores, in the second characteristic amount table 140d, the extracted second characteristic amounts in association with the times corresponding to the second frames from which the second characteristic amounts are extracted.

An exemplary process performed by the characteristic amount extraction unit 150b to extract a characteristic amount from a first frame or a second frame will be described. The process of extracting a characteristic amount from a first frame and the process of extracting a characteristic amount from a second frame are the same and thus the first frame and the second frame will be collectively referred to as a frame.

The characteristic amount extraction unit 150b extracts, as an amount of a characteristic, for example, a cubic higher-order local autocorrelation (CHLAC) characteristic that obtained by extending N displacements $a_i$ in the spatial direction and the time direction on the basis of the video characteristic with respect to the frame, for example, an autocorrelation function of order N represented by Equation (1).

$$x_f^N(a_1, \ldots, a_N) = \int f(r)f(r+a_i) \ldots f(r+a_N) \qquad (1)$$

In Equation (1), f is a chronological pixel value (difference value) and a reference point (pixel of interest) r and N displacements $a_i$ (i=1, ..., N) viewed from the reference point are three-dimensional vectors having the two-dimensional coordinates in the difference frame and the time as components. In Equation (1), the integration range in the time direction may be any parameter on which degree of correlation in the time direction is taken.

Figure 7:
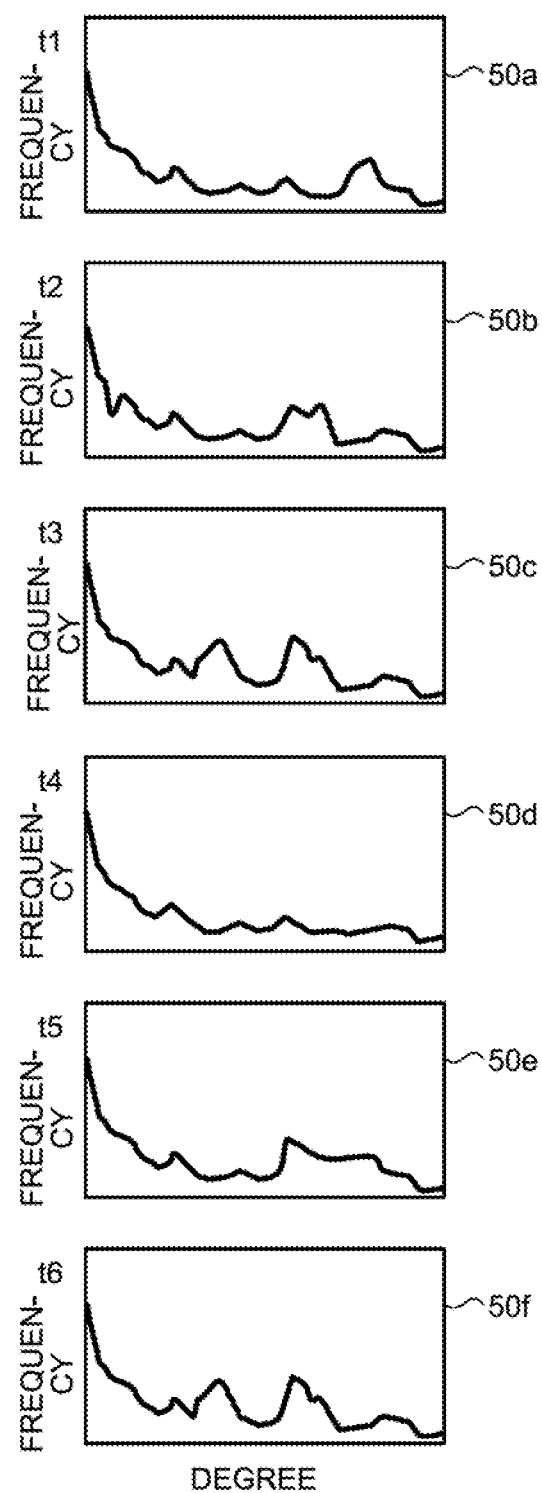
FIG. 7 is a diagram representing each exemplary first characteristic amount that is extracted from each first frame.

FIG. 7 is a diagram representing each exemplary first characteristic amount that is extracted from each first frame. The vertical axis of each first characteristic amount corresponds to the frequency (vector) and the horizontal axis corresponds to the degree of the vector. FIG. 7 represents first characteristic amounts 50a, 50b, 50c, 50d, 50e and 50f as examples.

The first characteristic amount 50a in FIG. 7 is a first characteristic amount that is extracted from a first frame at a time t1. The first characteristic amount 50b is a first characteristic amount that is extracted from a first frame at a time t2. The first characteristic amount 50c is a first characteristic amount that is extracted from a first frame at a time t3. The first characteristic amount 50d is a first characteristic amount that is extracted from a first frame at a time t4. The first characteristic amount 50e is a first characteristic amount that is extracted from a first frame at a time t5. The first characteristic amount 50f is a first characteristic amount that is extracted from a first frame at a time t6.

The characteristic amount extraction unit 150b registers each of the first characteristic amounts in association with the time corresponding to the first frame from which the first characteristic amount is extracted in the first characteristic amount table 140c. For example, the times t1 to tn in the first characteristic amount table 140c are relative times with respect to the origin that is the time at which imaging the robot 5 is started in the preparation stage.

Figure 8:
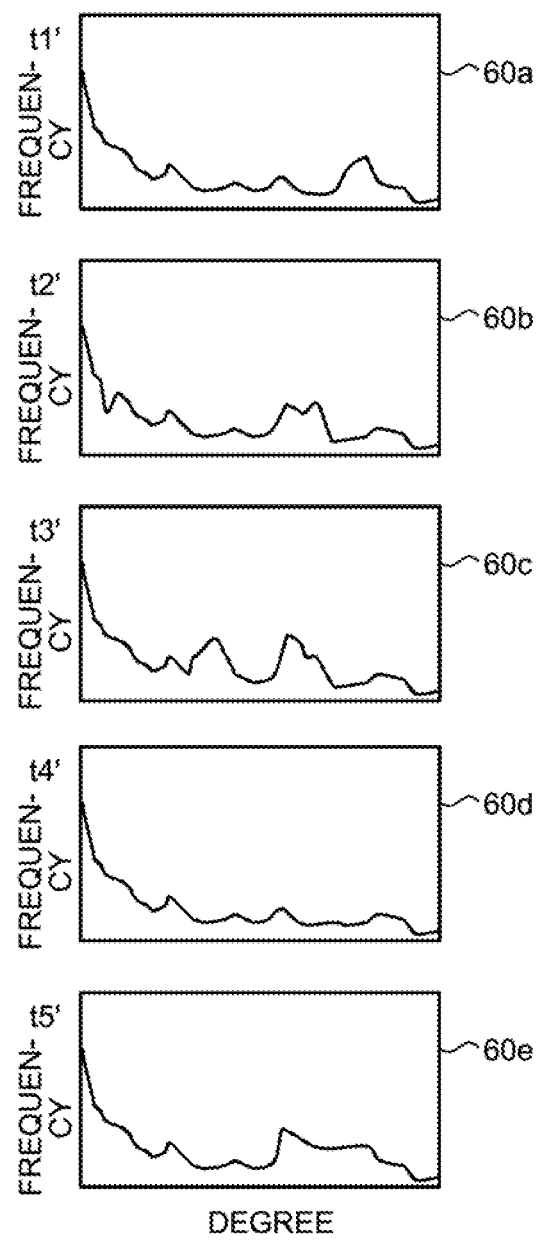
FIG. 8 is a diagram representing each exemplary second characteristic amount that is extracted from each second frame.

FIG. 8 is a diagram representing each exemplary second characteristic amount that is extracted from each second frame. The vertical axis of each second characteristic amount corresponds to the frequency (vector) and the horizontal axis corresponds to the degree of the vector. FIG. 8 represents second characteristic amounts 60a, 60b, 60c, 60d and 60e as examples.

The second characteristic amount 60a in FIG. 8 is a second characteristic amount that is extracted from a second frame at a time t1'. The second characteristic amount 60b is a second characteristic amount that is extracted from a second frame at a time t2'. The second characteristic amount 60c is a second characteristic amount that is extracted from a second frame at a time t3'. The second characteristic amount 60d is a second characteristic amount that is extracted from a second frame at a time t4'. The second characteristic amount 60e is a second characteristic amount that is extracted from a second frame at a time t5'.

The characteristic amount extraction unit 150b registers each of the second characteristic amounts in association with the time corresponding to the second frame from which the second characteristic amount is extracted in the second characteristic amount table 140d. For example, in the times t1' to tn' in the second characteristic amount table 140d are relative times with respect to the origin that is the time at which imaging the robot 5 is started in the abnormality detection stage.

Return to descriptions of FIG. 6. The determination unit 150c is a processing unit that compares the first characteristic amounts and the second characteristic amounts, specifies the first characteristic amount that is the closest to the second characteristic amount, and determines whether there is abnormality in the work operation on the basis of the abnormality value between the specified first characteristic amount and the second characteristic amount. An exemplary process performed by the determination unit 150c will be described below.

Figure 9:
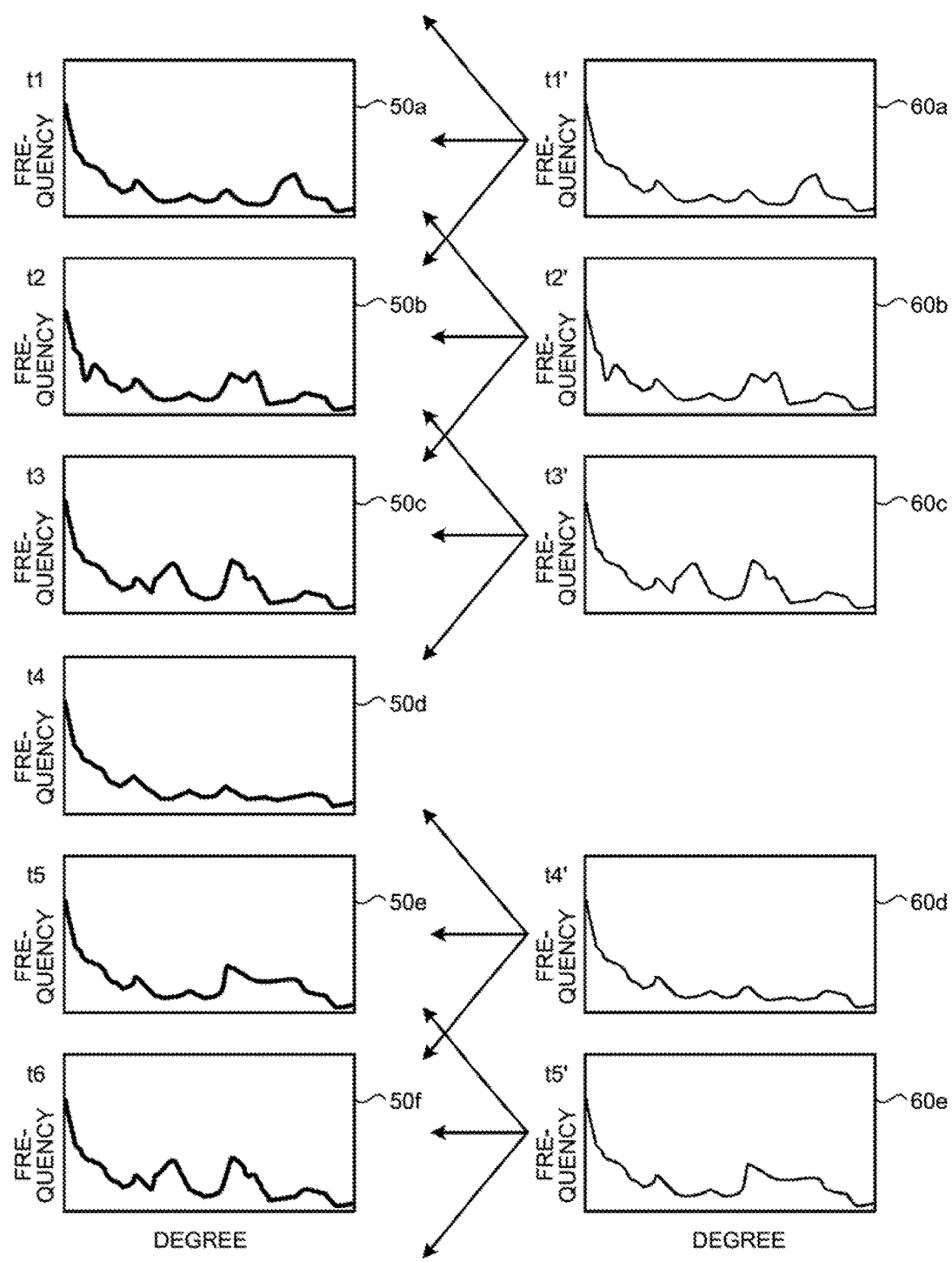
FIG. 9 is a diagram for explaining a process performed by a determination unit according to the first embodiment.

FIG. 9 is a diagram for explaining the process performed by the determination unit according to the first embodiment. The determination unit 150c chooses a second characteristic amount and chooses multiple first characteristic amounts within given times before and after the time of the chosen second characteristic amount. The determination unit 150c calculates abnormality values between the chosen second characteristic amount and the multiple first characteristic amounts. The determination unit 150c calculates the distances between the second characteristic amount and the vectors of the first characteristic amounts as abnormality values.

$$D_M(x) = \sqrt{(x-\mu)^T \Sigma^{-1} (x-\mu)} \qquad (2)$$

For example, when calculating the distance between the vector of a second characteristic amount and the vector of a first characteristic amount, the determination unit 150c may use the Mahalanobis distance. The Mahalanobis distance is defined by Equation (2). In Equation (2), x represents the vector of the second characteristic amount, µ represents an average vector of the first characteristic amounts and Σ represents a variance-covariance matrix.

The determination unit 150c determines that the smallest abnormality value among the multiple abnormality values is the abnormality value of the chosen second characteristic amount. With respect to other second characteristic amounts, the determination unit 150c calculates the abnormality values of the second characteristic amounts by repeatedly executing the above-described process.

According to FIG. 9, for example, the determination unit 150c chooses the second characteristic amount 60b at the time t2' and regards the first characteristic amounts at the times contained in the given times before and after the time t2' as the characteristic amounts 50a to 50c at the times t1 to t3. The given times before and after the time t2' may be set by the manager in advance. In this case, the determination unit 150c compares the second characteristic amount 60b with each of the first characteristic amounts 50a to 50c, specifies multiple abnormality values, and determines the smallest abnormality value among the specified abnormality values as the abnormality value of the second characteristic amount 60b. The determination unit 150c executes the above-described process repeatedly with respect to other second characteristic amounts.

The determination unit 150c determines whether there is an abnormality value that exceeds a given threshold on the basis of the abnormality values of the respective second characteristic amounts. When there is an abnormality value exceeding the given threshold, the determination unit 150c determines that there is abnormality in the work operation of the robot 5 in the abnormality detection stage and outputs the determination result to the display unit 130 or another external device.

Figure 10:
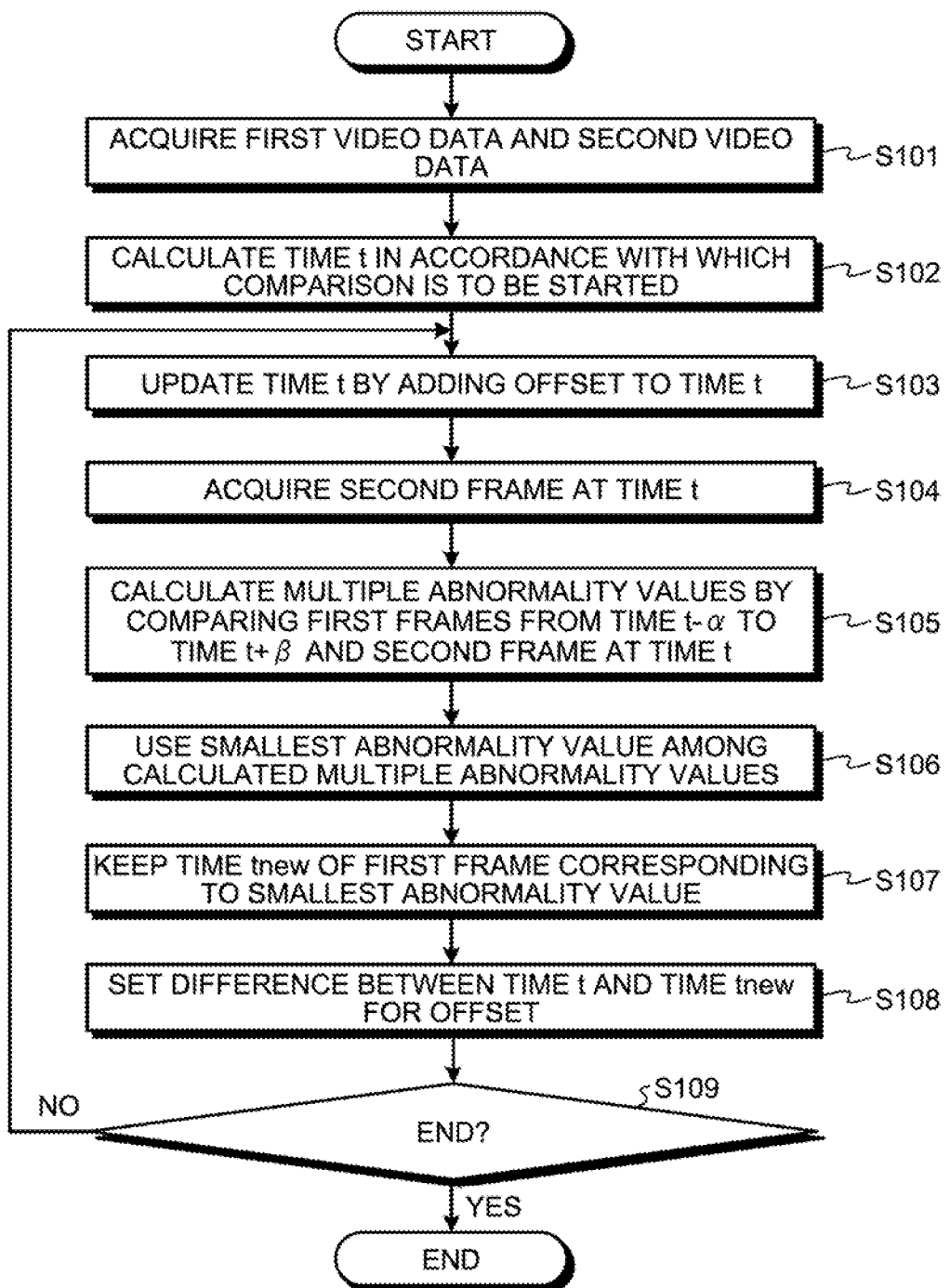
FIG. 10 is a flowchart illustrating a procedure of processes performed by the abnormality detection device according to the first embodiment.

An exemplary procedure of processes performed by the abnormality detection device 100 according to the first embodiment will be described. FIG. 10 is a flowchart illustrating the procedure processes performed by the abnormality detection device 100 according to the first embodiment. As illustrated in FIG. 10, the communication controller 150a of the abnormality detection device 100 acquires the first video data 140a and second video data 140b (step S101). The determination unit 150c of the abnormality detection device 100 calculates a time t in accordance with which comparison is to be started (step S102). For example, at step S102, the determination unit 150c calculates the time of the first frame among the frames contained in the first video data 140a or the second video data 140b as the time t in accordance with which the comparison is to be started.

The determination unit 150c updates the time t by adding an offset to the time t (step S103). For example, assume that the initial value of the offset is 0. The determination unit 150c acquires the second frame corresponding to the time t (step S104). The determination unit 150c compares each of the first frames from the time t−α to the time t+β with the second frame at the time t to calculate multiple abnormalities (step S105). Although illustrations are omitted in FIG. 10, at step S105, the determination unit 150c compares the first characteristic amount of the first frame and the second characteristic amount of the second frame to calculate the abnormality value.

The determination unit 150c uses the smallest abnormality value among the calculated multiple abnormality values (step S106). The determination unit 150c keeps a time tnew of the first frame corresponding to the smallest abnormality value (step S107). For example, at step S107, when the set of the first frame and the second frame realizing the smallest abnormality value is the set of the first frame at the time t1 and the second frame at the time t1', the determination unit 150c sets the time t1 for the time tnew.

The determination unit 150c sets the difference between the time t and the time tnew for the offset (step S108). The determination unit 150c determines whether to end the process (step S109). When the process is not to be ended (NO at step S109), the determination unit 150c moves to step S103. When the process is to be ended (YES at step S109), the determination unit 150c ends the work process performed by the robot 5.

The effect of the abnormality detection device 100 according to the first embodiment will be described. When calculating an abnormality value of a second characteristic amount, the abnormality detection device 100 searches for the first characteristic amount that is the closest to the second characteristic amount within the given time range based on the time of the second characteristic amount and calculates an abnormality value between the searched first characteristic amount and the second characteristic amount. Accordingly, even when a variance in the work that does not have any adverse effect on the assembling work occurs, the abnormality value is prevented from increasing due to the variance in the work, which makes it possible to solve the problem in that it is erroneously detected that abnormality occurs in the work of the robot 5.

Figure 11:
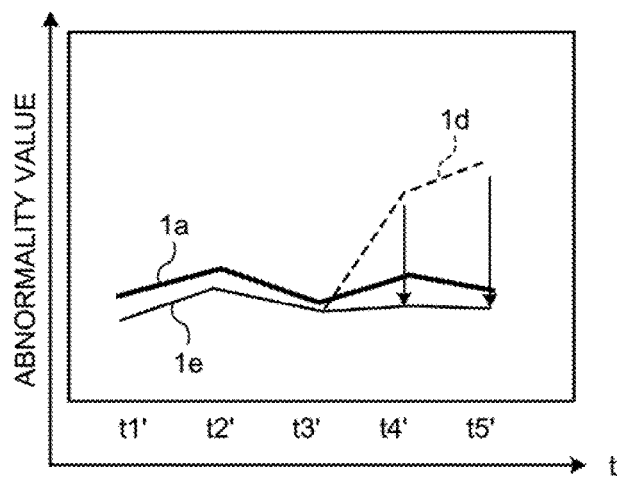
FIG. 11 is a diagram for explaining an effect of the first embodiment.

FIG. 11 is a diagram for explaining the effect of the first embodiment. The vertical axis in FIG. 11 is an axis corresponding to the abnormality value and the horizontal axis is an axis corresponding to the time. The line segment 1a represented in FIG. 11 is a line segment representing the average value of the normal spaces as the line segment 1a represented in FIG. 2 does. A line segment 1d is a transition of the abnormality value that is calculated by the abnormality detection device 40 of the reference example. A line segment 1e is the transition of the abnormality value that is calculated by the abnormality detection device 100 of the first embodiment.

For example, in the abnormality detection device 40 of the reference example, even when a variance in the work not having any adverse effect on the assembling work occurs, the abnormality value exceeds the threshold as represented by the line segment 1d and thus the abnormality detection device 40 erroneously detects that abnormality occurs. On the other hand, in the abnormality detection device 100 according to the first embodiment, even when a variance in the work not having any adverse effect on the assembling work occurs, the abnormality value does not exceed the threshold and thus it is possible to deter erroneous detection of abnormality.

The determination unit 150c according to the embodiment compares the second characteristic amount and each of the first characteristic amounts and calculates multiple abnormality values; however, the determination unit 150c is not limited to this. For example, the determination unit 150c may collectively compare the second characteristic amount and the first characteristic amounts and calculate multiple abnormality values at a time. Furthermore, when comparing the second characteristic amount and the first characteristic amounts, the determination unit 150c may, with respect to part of the order, narrow the first characteristic amounts similar to the second characteristic amount and, from the narrowed first characteristic amounts, specify the first characteristic amount that is the most similar to the second characteristic amount as a subject with respect to which an abnormality value is calculated.

Another process performed by the characteristic amount extraction unit 150b to extract a characteristic amount from a first frame will be described. The characteristic amount extraction unit 150b averages the first characteristic amount that is extracted from the first frame of the video data by the imaging device 10a by performing imaging at a time t and the first characteristic amount that is extracted from the first frame of the video data by the imaging device 10b by performing imaging or chooses the first characteristic amount of each first frame of the imaging device in a time zone where the amount of move of the subject is observed more notably depending on the posture of the imaging device with respect to the subject. The characteristic amount extraction unit 150b may register the averaged or chosen first characteristic amount as the first characteristic amount of the first frame at the time t in the first characteristic amount table 140c.

Another process performed by the characteristic amount extraction unit 150b to extract a characteristic amount from a second frame will be described. The characteristic amount extraction unit 150b averages the second characteristic amount that is extracted from the second frame of the video data obtained by the imaging device 10a by performing imaging at the time t' and the second characteristic amount that is extracted from the second frame of the video data obtained by the imaging device 10b by performing imaging or chooses the second characteristic amount of each second frame of the imaging device in a time zone where the amount of move of the subject is observed more notably depending on the posture of the imaging device with respect to the subject. The characteristic amount extraction unit 150b may register the averaged or chosen second characteristic amount as the second characteristic amount of the second frame at the time t' in the second characteristic amount table 140d.

As described above, the characteristic amount extraction unit 150b sets, as the characteristic amount of a frame, the characteristic amount obtained by averaging or choosing from the characteristic amounts of the frame of the video data obtained by imaging by the imaging devices 10a and 10b that are set in different positions. Accordingly, it is possible to accurately specify the characteristic amount without any effect of, for example, noise.

Second Embodiment

Figure 12:
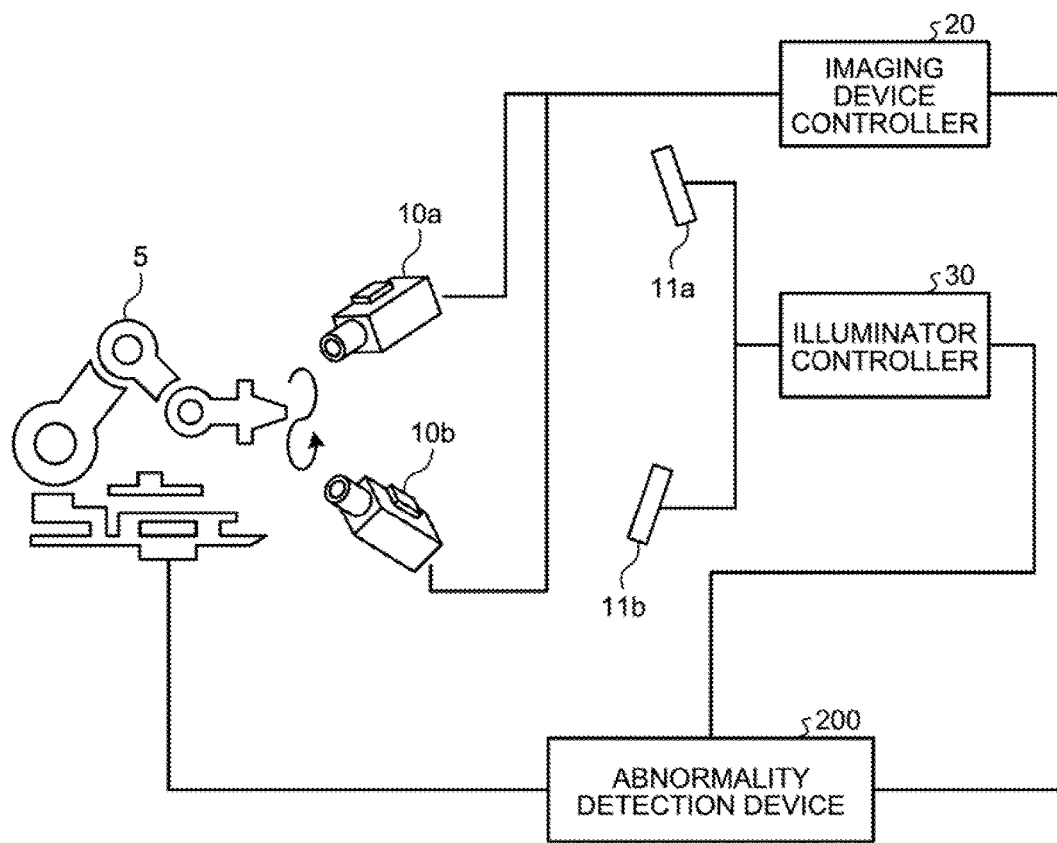
FIG. 12 is a diagram representing a configuration of a system according to a second embodiment.

A configuration of the system according to the second embodiment will be described. FIG. 12 is a diagram representing the configuration of the system according to the second embodiment. As illustrated in FIG. 12, the system includes the robot 5, the imaging devices 10a and 10b, the illuminators 11a and 11b, the imaging device controller 20, the illuminator controller 30, and an abnormality detection device 200.

Descriptions of the robot 5, the imaging devices 10a and 10b, the illuminators 11a and 11b, the imaging device controller 20, and the illuminator controller 30 in FIG. 12 are the same as those given to FIG. 1 and thus they will be omitted.

Figure 13:
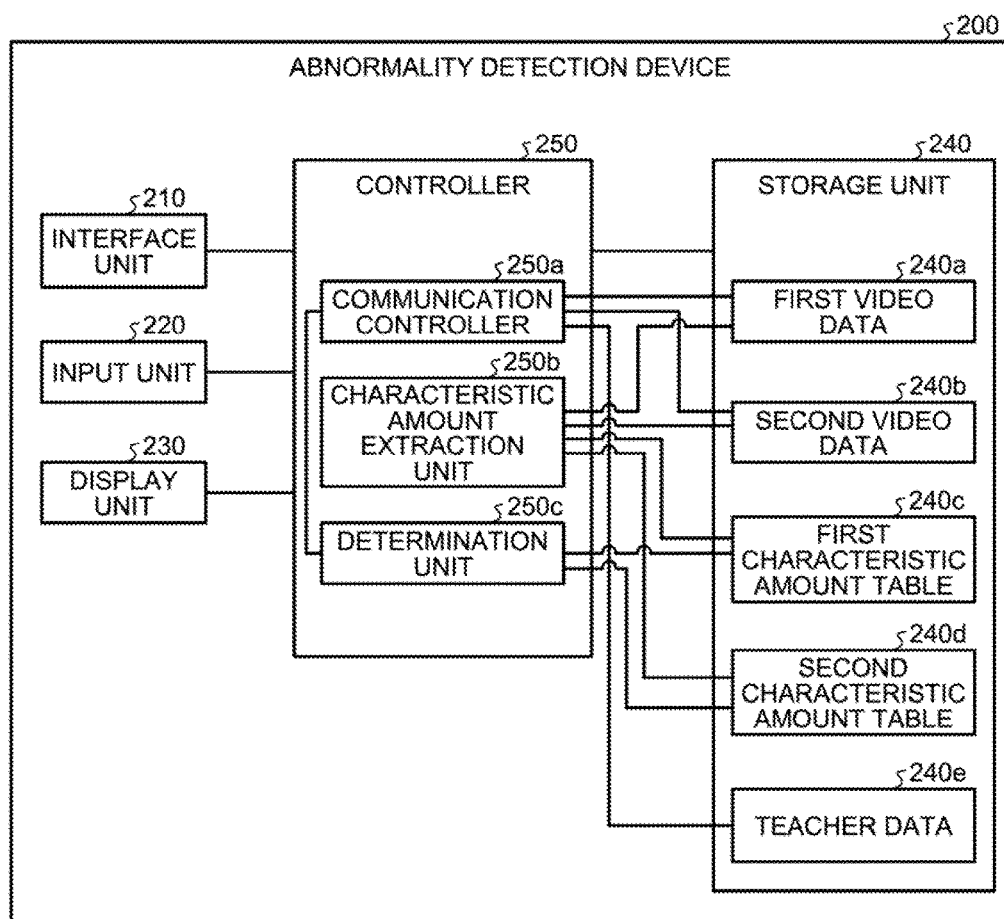
FIG. 13 is a functional block diagram representing a configuration of an abnormality detection device according to the second embodiment.

The abnormality detection device 200 is a device that detects whether there is abnormality in the work of the robot 5. FIG. 13 is a functional block diagram representing a configuration of the abnormality detection device according to the second embodiment. As illustrated in FIG. 13, the abnormality detection device 200 includes an interface unit 210, an input unit 220, a display unit 230, a storage unit 240 and a controller 250.

The interface unit 210 is a processing unit that executes data communications with the robot 5, the imaging device controller 20 and the illuminator controller 30. The controller 250, which will be described below, communicates data with the robot 5, the imaging device controller 20 and the illuminator controller 30 via the interface unit 210.

The input unit 220 is an input device that inputs various types of information to the abnormality detection device 200. The input unit 220 corresponds to, for example, a keyboard and a mouse. The display unit 230 is a display device that displays various types of information that is output from the controller 250 and corresponds to a liquid crystal display or a monitor.

The storage unit 240 includes first video data 240a, second video data 240b, a first characteristic amount table 240c, a second characteristic amount table 240d, and teacher data 240e. The storage unit 240 corresponds to a semiconductor memory device, such as a RAM, a ROM or a flash memory, or a storage device, such as a HDD.

Descriptions of the first video data 240a and the second video data 240b are the same as those of the first video data 140a and the second video data 140b represented in FIG. 6.

Descriptions of the first characteristic amount table 240c and the second characteristic amount table 240d are the same as those of the first characteristic amount table 140c and the second characteristic amount table 140d represented in FIG. 6.

Figures 14, 15:
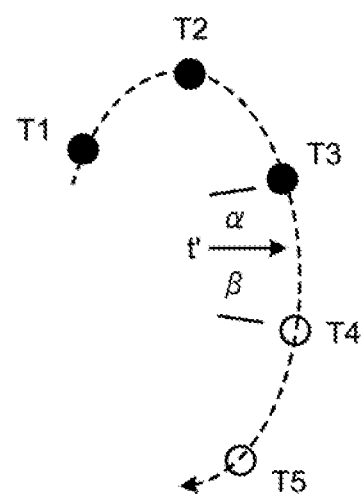
FIG. 14 is a table representing an exemplary data structure of teacher data.
FIG. 15 is a diagram for explaining a process performed by a determination unit according to the second embodiment.

The teacher data 240e is data in which a teacher point representing the time after the start of the work of the robot 5 and the content of the work of the robot 5 are associated with each other. FIG. 14 is a table representing an exemplary data structure of the teacher data. As illustrated in FIG. 14, in the teacher data 240e, the teacher point and the content of the work are associated with each other. The same teacher data as the teacher data 240e is uploaded into the robot 5 and the robot 5 does the work on the basis of the teacher data.

Return to descriptions of FIG. 13. The controller 250 includes a communication controller 250a, a characteristic amount extraction unit 250b and a determination unit 250c. The controller 250 corresponds to an integrated device, such as an ASIC or a FPGA. The controller 250 corresponds to an electronic circuit, such as a CPU or a MPU.

The communication controller 250a is a processing unit that acquires video data by performing data communications with the imaging device controller 20. For example, the communication controller 250a acquires video data obtained by imaging a normal work operation of the robot 5 in a preparation stage from the imaging device controller 20. The communication controller 250a stores the video data that is acquired from the imaging device controller 20 as the first video data 240a in the storage unit 240.

The communication controller 250a acquires the video data obtained by imaging the work operation of the robot 5 in an abnormal detection stage from the imaging device controller 20. In the abnormal detection stage, the communication controller 250a stores the video data that is acquired from the imaging device controller 20 as the second video data 240b in the storage unit 240.

In the preparation stage and the abnormal detection stage, the communication controller 250a outputs a control instruction to turn on the illuminator to the illuminator controller 30 while the imaging device is performing imaging.

The communication controller 250a acquires the teacher data 240e via the interface unit 210 and the input unit 220 and stores the acquired teacher data 240e in the storage unit 240. In the abnormality detection stage, the communication controller 250a performs data communications with the robot 5 while the imaging device controller 20 is obtaining the second vide data by imaging and acquires, from the robot 5, information representing to which teacher point the robot 5 proceeds the work. The communication controller 250a outputs, to the determination unit 250c, correspondence information in which the time of the second frame of the second video data 240b and the teacher point of the content of the ended work are associated with each other.

The characteristic amount extraction unit 250b extracts a first characteristic amount from each first frame of the first video data 240a and registers the extracted first characteristic amount in association with the time corresponding to the first frame from which the first characteristic amount is extracted in the first Characteristic amount table 240c. The characteristic amount extraction unit 250b extracts a second characteristic amount from each second frame of the second video data 240b and stores the extracted second characteristic amount in association with the time corresponding to the second frame from which the second characteristic amount is extracted in the second characteristic amount table 240d. The process performed by the characteristic amount extraction unit 250b to extract a characteristic amount from a frame is the same as that performed by the characteristic amount extraction unit 150b represented in the first embodiment.

The determination unit 250c compares the first characteristic amounts and the second characteristic amount, specifies the first characteristic amount that is the closest to the second characteristic amount, and determines whether there is abnormality in the work operation on the basis of the abnormality value between the specified first characteristic amount and the second characteristic amount. An exemplary process performed by the determination unit 250c will be described below.

The determination unit 250c chooses a second characteristic amount and chooses multiple first characteristic amounts contained within given times before and after the time of the chosen second characteristic amount. The determination unit 250c compares the time of the second characteristic amount and the correspondence information, specifies to which teacher point the work contents have been ended, and determines the given times before and after the time.

FIG. 15 is a diagram for explaining the process performed by the determination unit according to the second embodiment. According to FIG. 15, for example, the time of the chosen second characteristic amount is t' and, at the time t', the work content to that at the teacher point T3 have ended. In this case, the determination unit 250c chooses the multiple first characteristic amounts contained in the time from the teacher point T3 whose corresponding work has been ended to the next teacher point T4. In the example illustrated in FIG. 15, the determination unit 250c determines the first characteristic amounts at times contained in the time from t'−α to t'+β, where α corresponds to the time obtained by subtracting T3 from t' and β corresponds to the time obtained by subtracting t' from T4.

The determination unit 250c calculates abnormality values between the second characteristic amount and the multiple first characteristic amounts. For example, the determination unit 250c calculates the distance between the vector of the second characteristic amount and the vector of the first characteristic amount as an abnormality value. The determination unit 250c determines that the smallest abnormality value among the multiple abnormality values is the abnormality value of the chosen second characteristic amount. With respect to other second characteristic amounts, the determination unit 250c calculates the abnormality value of each of the second characteristic amounts by repeatedly executing the above-described process.

Figure 16:
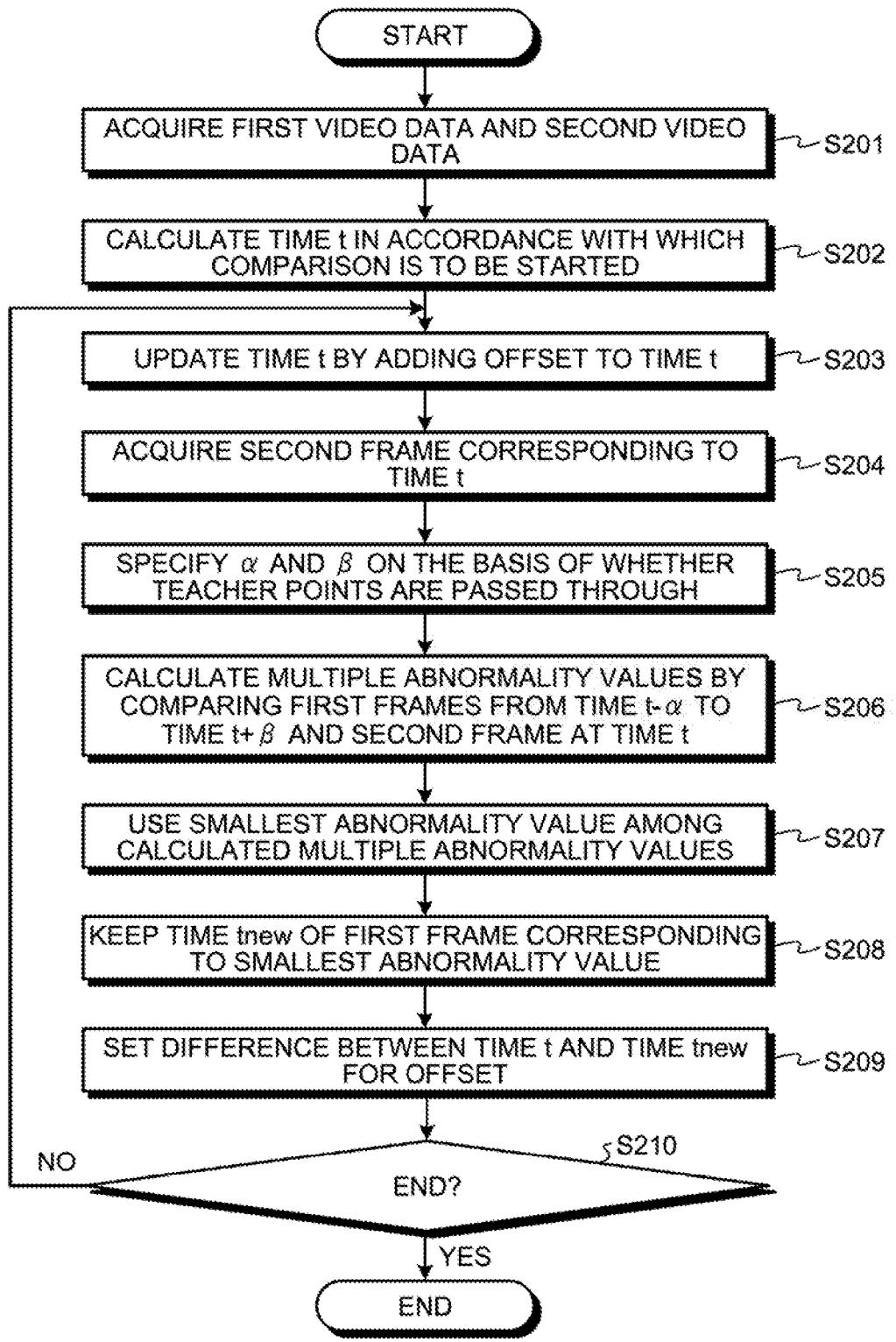
FIG. 16 is a flowchart illustrating a procedure of processes performed by the abnormality detection device according to the second embodiment.

An exemplary procedure of processes performed by the abnormality detection device 200 according to the second embodiment will be described. FIG. 16 is a flowchart illustrating the procedure of processes performed by the abnormality detection device according to the second embodiment. As illustrated in FIG. 16, the communication controller 250a of the abnormality detection device 200 acquires the first video data 240a and the second video data 240b (step S201). The determination unit 250c of the abnormality detection device 200 calculates a time t in accordance with which comparison is to be started (step S202). For example, at step S202, the determination unit 250c calculates the time of the first frame among the frames contained in the first video data 240a or the second video data 240b as the time t in accordance with which the comparison is to be started.

The determination unit 250c updates the time t by adding an offset to the time t (step S203). For example, assume that the initial value of the offset is 0. The determination unit 250c acquires the second frame corresponding to the time t (step S204). The determination unit 250c specifies α and β on the basis of whether the teacher points are passed through (step S205).

The determination unit 250c compares each of the first frames from the time t−α to the time t+β with the second frame at the time t to and calculates multiple abnormality values (step S206). Although illustrations are omitted in FIG. 16, at step S206, the determination unit 250c compares the first characteristic amount of the first frame and the second characteristic amount of the second frame and calculates the abnormality value.

The determination unit 250c uses the smallest abnormality value among the calculated multiple abnormality values (step S207). The determination unit 250c keeps a time tnew of the first frame corresponding to the smallest abnormality value (step S208). For example, at step S208, when the set of the first frame and the second frame realizing the smallest abnormality value is the set of the first frame at the time t1 and the second frame at the time t1', the determination unit 250c sets the time t1 for the time tnew.

The determination unit 250c sets the difference between the time t and the time tnew for the offset (step S209). The determination unit 250c determines whether to end the process (step S210). When the process is not to be ended (NO at step S210), the determination unit 250c moves to step S203. When the process is to be ended (YES at step S210), the determination unit 250c ends the work process performed by the robot 5.

The effect of the abnormality detection device 200 according to the second embodiment will be described. When calculating an abnormality value of a second characteristic value, the abnormality detection device 200 specifies the time of a first characteristic amount to be compared to the second characteristic amount on the basis of whether the teacher points are passed through. Accordingly, it is possible to narrow down the number of first characteristic amounts with respect to which abnormality values between the first characteristic amounts and the second characteristic amount are to be calculated and thus calculate abnormality values efficiently.

Figure 17:
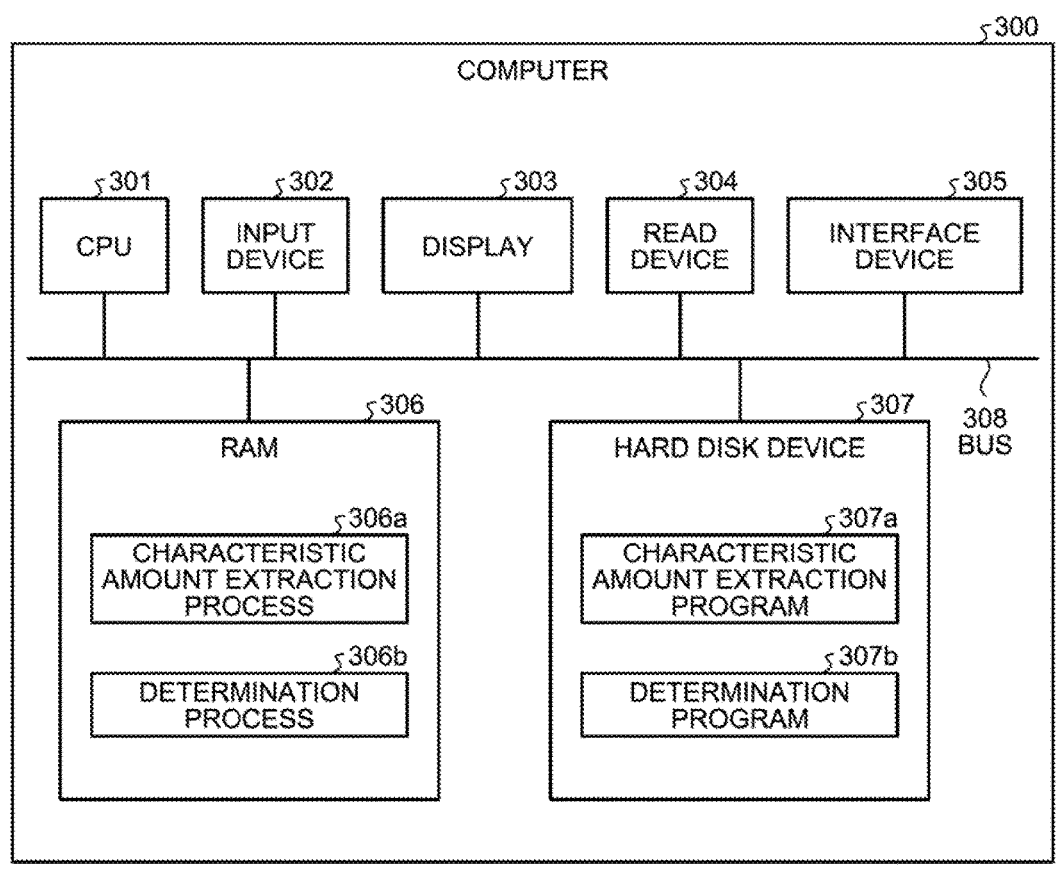
FIG. 17 is a diagram representing an exemplary computer that executes an abnormality detection program.

An exemplary computer that executes an abnormality detection program that realizes functions equivalent to the abnormality detection devices 100 and 200 illustrated in the embodiments will be described. FIG. 17 is a diagram of an exemplary computer that executes the abnormality detection program.

As illustrated in FIG. 9, a computer 300 includes a CPU 301 that executes various arithmetic operations, an input device 302 that receives an input of data from a user, and a display 303. The computer 300 includes a read device 304 that reads a program, etc., from a storage medium and an interface device 305 that gives and receives data to and from another computer via a network. The computer 300 further includes a RAM 306 that temporarily stores various types of information and a hard disk device 307. Each of the devices 301 to 307 is connected to a bus 308.

The hard disk device 307 reads a characteristic extraction program 307a and a determination program 307b and loads them into the RAM 306. The characteristic extraction program 307a functions as a characteristic amount extraction process 306a. The determination program 307b functions as a determination process 306b.

The characteristic extraction program 307a and the determination program 307b are not necessarily stored in the hard disk device 307 from the beginning. For example, each of the programs may be stored in a "portable physical medium", such as a flexible disk (FD), a CD-ROM, a DVD disk, a magneto-optical disk or an IC card. The computer 300 may read and execute the characteristic extraction program 307a and the determination program 307b.

According to the first embodiment of the present invention, it is possible to accurately detect abnormality due to a variance in the work of the subject.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An abnormality detection device comprising:
   a memory; and
   a processor coupled to the memory, wherein the processor executes a process comprising:
   storing each first frame contained in video data obtained by imaging a normal work operation of a subject and a first characteristic amount representing a characteristic of each first frame in association with each other in the memory;
   storing each second frame contained in video data obtained imaging a work operation of the subject and a second characteristic amount representing a characteristic of each second frame in association with each other in the memory;
   choosing a second characteristic amount;
   specifying a first work content having been ended based on a time of the chosen second characteristic amount and teach data which include work contents respectively corresponding to a time for each work content;
   specifying a first time of the first work content and a second time of a second work content, wherein the second work content is a next work content of the first work content;
   acquiring multiple first characteristic amounts contained within times between a start time and an end time, wherein the start time is obtained by subtracting the first time from the time of the chosen second characteristic amount and the end time is obtained by subtracting the second time from the time of the chosen second characteristic amount;
   comparing the chosen second characteristic amount with the multiple first characteristic amounts;
   specifying a first characteristic amount that is the closest to the chosen second characteristic amount; and
   determining whether the work operation is abnormal on the basis of the specified first characteristic amount and the chosen second characteristic amount.

2. The abnormality detection device according to claim 1, the process further comprising extracting the first characteristic amount of each first frame by averaging first characteristic amounts of the first frames containing the same subject imaged by multiple imaging devices that are set at different places or choosing the first characteristic amount of each first frame obtained by an imaging device in a time zone where an amount of movement of the subject is observed more notably depending on a posture of the imaging device with respect to the subject, and extracting the second characteristic amount of each second frame by averaging second characteristic amounts of the second frames containing the same subject imaged by the multiple imaging devices or choosing the second characteristic amount of each second frame obtained by the imaging device in a time zone where the amount of movement of the subject is observed more notably depending on the posture of the imaging device with respect to the subject.

3. An abnormality detection method comprising:
   storing each first frame contained in video data obtained by imaging a normal work operation of a subject and a first characteristic amount representing a characteristic of each first frame in association with each other in a memory;
   storing each second frame contained in video data obtained imaging a work operation of the subject and a second characteristic amount representing a characteristic of each second frame in association with each other in the memory;
   choosing a second characteristic amount;
   specifying a first work content having been ended based on a time of the chosen second characteristic amount and teach data which include work contents respectively corresponding to a time for each work content;
   specifying a first time of the first work content and a second time of a second work content, wherein the second work content is a next work content of the first work content;
   acquiring multiple first characteristic amounts contained within times between a start time and an end time, wherein the start time is obtained by subtracting the first time from the time of the chosen second characteristic amount and the end time is obtained by subtracting the second time from the time of the chosen second characteristic amount;
   comparing the chosen second characteristic amount with the multiple first characteristic amounts;
   specifying a first characteristic amount that is the closest to the chosen second characteristic amount; and
   determining whether the work operation is abnormal on the basis of the specified first characteristic amount and the chosen second characteristic amount.

4. A non-transitory computer-readable storage medium having stored therein a program that causes a computer to execute a process including:
   storing each first frame contained in video data obtained by imaging a normal work operation of a subject and a first characteristic amount representing a characteristic of each first frame in association with each other in a memory;
   storing each second frame contained in video data obtained imaging a work operation of the subject and a second characteristic amount representing a characteristic of each second frame in association with each other in the memory;
   choosing a second characteristic amount;
   specifying a first work content having been ended based on a time of the chosen second characteristic amount and teach data which include work contents respectively corresponding to a time for each work content;
   specifying a first time of the first work content and a second time of a second work content, wherein the second work content is a next work content of the first work content;
   acquiring multiple first characteristic amounts contained within times between a start time and an end time, wherein the start time is obtained by subtracting the first time from the time of the chosen second characteristic amount and the end time is obtained by subtracting the second time from the time of the chosen second characteristic amount;

comparing the chosen second characteristic amount with the multiple first characteristic amounts;

specifying a first characteristic amount that is the closest to the chosen second characteristic amount; and determining whether the work operation is abnormal on the basis of the specified first characteristic amount and the chosen second characteristic amount.

* * * * *